J. L. CHEVALIER.
Self-Adjusting Dams for Dental Use.

No. 152,074. Patented June 16, 1874.

WITNESSES:

INVENTOR.

BY

ATTORNEYS.

UNITED STATES PATENT OFFICE.

JACOB L. CHEVALIER, OF NEWARK, NEW JERSEY.

IMPROVEMENT IN SELF-ADJUSTING DAMS FOR DENTAL USE.

Specification forming part of Letters Patent No. 152,074, dated June 16, 1874; application filed May 29, 1874.

*To all whom it may concern:*

Figure 1:
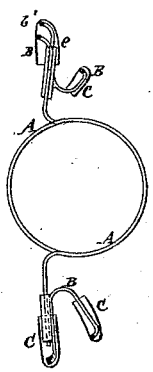
Figure 2:
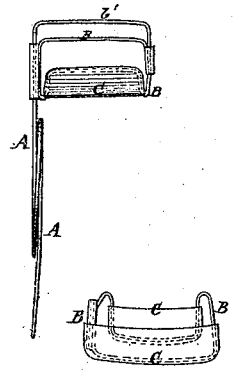
Figure 3:
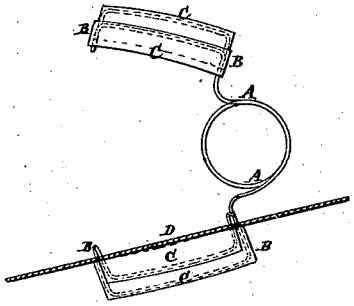
Figure 4:
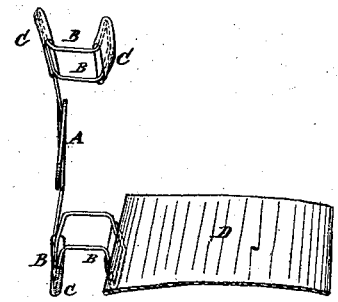

Be it known that I, JACOB LOUIS CHEVALIER, of Newark, Essex county, New Jersey, have invented a new and useful Improvement in Self-Adjusting Dam for Dental Operations, of which the following is a specification:

Figure 1 is a side view of my device, partly in section, to show the construction. Fig. 2 is a front view of the same, the upper front pad being removed, and the lower dam being detached. Fig. 3 is a side view of a modification of the same, designed for side teeth; and Fig. 4 is a front view of the same.

Similar letters of reference indicate corresponding parts.

My invention has for its object to furnish an improved device for dentists' use, for keeping the saliva away from the teeth being operated upon, so as to avoid the necessity of continually wiping out the mouth with cloths, tying rubber around the teeth, and similar devices, and which shall be simple in construction, conveniently and quickly applied, and effective in operation.

The invention consists in the combination of the spring-coil, the U-frames, and the rubber bags or pouches with each other, whether the said U-frames be rigidly connected with or pivoted to the said coil; in the combination of the extension-loop with the outer arm of the upper frame; and in the combination of the flap or curtain with the inner arm of the lower frame, as hereinafter fully described.

A represents the frame of the device, which is formed of wire bent into a coil, and with its ends bent outward. When intended for the front teeth, the coil may be made larger, as shown in Figs. 1 and 2, than when made for the side teeth, as shown in Figs. 3 and 4. To the projecting ends of the spring-coil A are attached, or upon them are formed, U shaped frames B, of such a length as to embrace two or three teeth. For the side teeth, the frames B should be rigidly attached to the ends of the coil A; but, for the front teeth, the frames B should be made with a socket to receive the ends of the coil A, so that the said frames B may be adjusted, as required. The inner arm of the upper frame B is made the shorter, as shown in Figs. 1 and 2, on account of the curvature of the roof of the mouth. The outer arm of the upper frame B of the front dam should be made with an extension bow or loop, $b'$, as shown in Figs. 1 and 2, so that it may be extended or contracted, as may be required. The arms of the frame B are covered with rubber bags or pouches C, which are designed to be stuffed with sponge or cotton to form pads, which stuffing may be readily moved about and adjusted, as may be desired, with a pointed instrument. To the inner arm of the lower frame B of the side dams is attached a rubber flap or curtain, D, to rest upon the tongue, and prevent said tongue from coming in contact with the tooth being operated upon, should it be raised involuntarily, accidentally, or purposely.

Five of the dams constitute a set—two for each side, and one for the front.

The frames B are made short on account of the impossibility of making them of such a curve as would correspond with the curvature of different jaws.

In using the front dam, the coil A is turned at right angles with the frames B, as shown in Figs. 1 and 2, so as to enter the mouth, and thus be out of the way of the operator. For the same reason, in using the side dams, the coil A enters first, so as to pass back between the jaws and the cheek.

Having thus described my invention, I claim as new and desire to secure by Letters Patent—

1. The combination of the spring-coil A, U-frames B, and rubber bags or pouches C, whether the said frames B be rigidly connected with or pivoted to the said coil A, substantially as herein shown and described.

2. The combination of the extension-loop $b'$ with the outer arm of the upper frame B, substantially as herein shown and described.

3. The combination of the flap or curtain D with the inner arm of the lower frame B, substantially as herein shown and described.

JACOB L. CHEVALIER.

Witnesses:
JAMES T. GRAHAM,
T. B. MOSHER.